United States Patent

Choi et al.

[11] Patent Number: 5,841,682
[45] Date of Patent: Nov. 24, 1998

[54] INVERSE DISCRETE COSINE TRANSFORMATION SYSTEM USING LEE'S ALGORITHM

[75] Inventors: Sung-Up Choi; Tae-Sung Kim, both of Seoul, Rep. of Korea

[73] Assignee: Samsung Electronics Co., Ltd., Kyungki-do, Rep. of Korea

[21] Appl. No.: 763,611

[22] Filed: Dec. 11, 1996

[30] Foreign Application Priority Data

Dec. 13, 1995 [KR] Rep. of Korea ................... 1995-49316

[51] Int. Cl.[6] ........................................................ G06F 17/14
[52] U.S. Cl. ...................................................... 364/725.03
[58] Field of Search ............................ 364/725.03, 725.02

[56] References Cited

U.S. PATENT DOCUMENTS 5,345,408  9/1994  Hoogenboom ..................... 364/725.03
5,477,469  12/1995  Motomura .......................... 364/725.03
5,508,949  4/1996  Konstantinides .................. 364/725.03

OTHER PUBLICATIONS

*IEEE Transactions by Acoustics, Speech, and Signal Processing*, vol. ASSP–32, No. 4, pp. 1243–1245 (Dec. 1984).
Rosenfeld, et al., *Digital Picture Processing, 2nd End.*, vol. 1, pp. 150–160 (1982).

*Primary Examiner*—Tan V. Mai
*Attorney, Agent, or Firm*—Myers Bigel Sibley & Sajovec

[57] ABSTRACT

A system for determining an Inverse Discrete Cosine Transformation (IDCT) which utilizes Lee's algorithm. The IDCT system includes initial operating means for receiving discrete cosine transformation data and outputting the result of a first and second addition of the inverse discrete cosine transformation data using Lee's algorithm. Also included are main operation means for receiving the result of the first and second addition of the inverse discrete cosine transformation using Lee's algorithm from the initial operation means and outputting the result of the multiplication operation and butterfly operation of the inverse discrete cosine transformation by using Lee's algorithm.

14 Claims, 4 Drawing Sheets

INVERSE DISCRETE COSINE TRANSFORMATION SYSTEM USING LEE'S ALGORITHM

FIELD OF THE INVENTION

The present invention relates to inverse discrete cosine transformations. More particularly, the present invention relates to systems for performing inverse discrete cosine transformations.

BACKGROUND OF THE INVENTION

Conventional systems for sending and receiving information such as information compressed using the JPEG (Joint Photograph Experts Group) or MPEG Motion Picture Experts Group) standards typically utilize compression and restoration of data to control the amount of data transmitted and received. Likewise, when storing information, such as images, compression of the data may save on storage space required to store an image.

Several ways of compressing data have been proposed. For example, the Discrete Fourier Transformation, Karhunen-Loeve compression, the Kohern method, the Hadamard transform and the discrete cosine transform (DCT) have been suggested for image compression. Among these transformations, DCT has the advantage of simplicity in calculation and ease in restoration of the original data from the transformed data. Furthermore, the discrete cosine transform comes the closest to approximating the energy compaction of the Karhunen-Loeve transform. See "Digital Picture Processing", Second Edition, Volume 1, Rosenfeld and Kak, pp. 150–160, 1982.

The Institute of Electrical and Electronic Engineers (IEEE) has established a definition for discrete cosine transformation and inverse discrete cosine transformation (IDCT). According to the IEEE's definition (ISO12818-2 DIS), the formula for the discrete cosine transformation is:

$$F(u, v) = \frac{2}{N} C(u)C(v) \sum_{X=0}^{N-1}\sum_{Y=0}^{N-1} f(x, y)\cos\frac{(2x+1)u\pi}{2N} \cos\frac{(2y+1)v\pi}{2N}$$

where $$C(u)C(v) = \frac{1}{\sqrt{2}} \text{ for } u = 0, v = 0 \text{ or } C(u)C(v) = 1 \text{ for } u \neq 0, v \neq 0.$$

The formula for the inverse discrete cosine transformation is:

$$f(u, v) = \frac{2}{N} \sum_{X=0}^{N-1}\sum_{Y=0}^{N-1} C(u)C(v)F(u, v)\cos\frac{(2x+1)u\pi}{2N} \cos\frac{(2y+1)v\pi}{2N}$$

In the above mentioned formulas, F(u,v) is a 12 bit integer from "–2048" to "2047" and f(u,v) is a 9 bit integer from "–256" to "255". However, utilizing the above formulas for DCT or IDCT may be unsuitable for some applications because of the time in calculating the multiplication or the size of hardware required to perform the calculations. For example when an 8-point DCT is performed, a multiplication is performed 64 times. Therefore, there has been considerably effort to reduce the number of multiplications required for the DCT or the IDCT. Among the methods which reduce the number of multiplications is a method known as "Lee's algorithm." Lee's algorithm reduces the number of multiplications to a maximum of 12 for an 8-point 1-dimensional IDCT. According to Lee's algorithm, the formula for calculating the IDCT is as follows:

$$x(k) = (1/4) \sum_{n=0}^{7} C(n)\cos\frac{(2k+1)n\pi}{16} X(n)$$

where $$C(n) = \frac{1}{\sqrt{2}} \text{ for } n = 0 \text{ or } C(n) = 1 \text{ for } n \neq 0.$$

A complete explanation of Lee's algorithm may be found in "A new Algorithm for computing the discrete cosine transform," IEEE Transactions on Acoustic, Speech, Signal Processing vol. ASSP-32. pp1243–1245, December 1984.

Because of the benefits of Lee's algorithm for determining an IDCT the need exists for efficient systems to carry out the inverse transformation.

SUMMARY OF THE INVENTION

In view of the above discussion, it is an object of the present invention to provide a system for determining an IDCT.

A further object of the present invention is to provide a system for determining an IDCT which may be less complex than conventional systems.

Yet another object of the present invention is to provide a system for determining an IDCT which maybe more rapid in the determination than conventional systems.

These and other objects of the present invention are provided by a system for determining an IDCT which utilizes Lee's algorithm. Such an IDCT system may include initial operating means for receiving discrete cosine transformation data and outputting the result of a first and second addition of the inverse discrete cosine transformation data using Lee's algorithm. Also included are main operation means for receiving the result of the first and second addition of the inverse discrete cosine transformation using Lee's algorithm from the initial operation means and outputting the result of the multiplication operation and butterfly operation of the inverse discrete cosine transformation by using Lee's algorithm.

In a further embodiment of the present invention, the initial operation means include initial adding means for receiving the discrete cosine transformation data and selectively performing an addition to provide first added data and for selectively performing a second addition of the discrete cosine transformation data and the first added data to provide second added data. First memory means receive and store the first added data from the initial adding means and discrete cosine transformed data and selectively return first added data and discrete cosine transformed data to the initial adding means for use in the second addition to provide the second added data. Second memory means receive, temporarily store and output discrete cosine transformed data and the second added data received from the initial adding means to the main operation means.

By dividing the inverse discrete cosine transformation using Lee's algoritm into a addition portion of the system and a butterfly and multiplication operation of the system the present systems may perform the IDCT using a single multiplier. Furthermore, multiple input data may be pipelined through the system to allow for overlapping operations which further enhance the speed of the IDCT. Thus, the present invention provides for a more rapid determination of an IDCT while not requiring a large number of multipliers.

In a further embodiment of the present invention, the initial adding means includes data input means for receiving the discrete cosine transformed data, temporarily storing and outputting the discrete cosine transformed data. Adding means receive the data from the data input means and selectively perform an addition of the discrete cosine transformed data and output the result as first added data.

In a particular embodiment of the present invention, the data input means may include a first memory which receives data points 1 through 4 of a first set of discrete cosine transformed data, temporarily stores the data points and selectively outputs the stored data. A second memory receives data points 5 through 8 of the first set of discrete cosine transformed data, temporarily stores the data points and selectively outputs the stored data. A third memory receives data points 5 through 8 of a second set of discrete cosine transformed data, temporarily stores the data points and selectively outputs the stored data. Finally, a fourth memory receives data points 1 through 4 of the second set of discrete cosine transformed data, temporarily stores the data points and selectively outputs the stored data. Thus, two sets of discrete cosine transformed data may be pipelined through the system of the present invention.

In another embodiment of the present invention, the adding means includes a first multiplexer which receives the stored data from the second memory and the fourth memory of the data input means and which selectively outputs the received data. A second multiplexer receives the output from the first multiplexer and returned data from the first memory means and selectively outputs the output from the first multiplexer and the returned data. A third multiplexer receives data from the first memory and the third memory of the data input means and selectively outputs the received data. A fourth multiplexer receives the output from the third multiplexer and the returned data from the first memory means and selectively outputs the received data. A first adder receives the output from the second multiplexer and the output from the fourth multiplexer and adds the values of the data received from the second multiplexer and the fourth multiplexer and outputs a result of the addition. In such a manner the same adder may be used for both additions of Lee's algorithm.

In another embodiment of the present invention, the first memory means includes a first submemory means for selectively storing the first added data from the initial adding means and discrete cosine transformed data and for outputting the stored data to the second multiplexer of the initial adding means for use in a second addition. A second submemory means selectively stores the first added data from the initial adding means and discrete cosine transformed data and outputs the stored data to the fourth multiplexer of the initial adding means for use in a second addition.

In a further embodiment the first submemory means includes a fifth multiplexer which receives the output from the first multiplexer of the initial adding means and the output from the first adder and which selectively outputs one of the output from the first multiplexer and the output from the first adder. A fifth memory electively receives, temporarily stores and outputs the stored output of thefth multiplexer. A sixth memory selectively receives, temporarily stores and outputs the stored output of the fifth multiplexer.

In yet another embodiment of the present invention, the submemory means includes a sixth multiplexer which receives the output from the third multiplexer of the initial adding means and the output from the first adder and which selectively outputs one of the output from the third multiplexer and the output from the first adder. A seventh memory selectively receives, temporarily stores and outputs the stored output of the sixth multiplexer. An eighth memory selectively receives, temporarily stores and outputs the stored output of the sixth multiplexer.

In a still further embodiment of the present invention, the second memory means includes third submemory means for selectively receiving, storing and outputting the second added data and fourth submemory means for selectively receiving, storing and outputting the second added data.

The third submemory means may include a seventh multiplexer which receives the output of the fifth multiplexer and the output of the sixth multiplexer and selectively outputs one of the output of the fifth multiplexer and the output of the sixth multiplexer. An eighth multiplexer receives the output of the seventh multiplexer and the returned data from the main operating means and selectively outputs one of the output of the seventh multiplexer and the returned data. A ninth multiplexer receives the output of the seventh multiplexer and the returned data from the main operating means and selectively outputs one of the output of the seventh multiplexer and the returned data. A first transmitting gate receives the returned data from the main operating means and outputs the data. A ninth memory receives the data from the first transmitting gate, temporarily stores the data and outputs the stored data. A tenth memory receives the output of the eighth multiplexer, temporarily stores the output of the eighth multiplexer and outputs the stored output of the eighth multiplexer. An eleventh memory receives the output from the ninth multiplexer, temporarily stores the output of the ninth multiplexer and outputs the stored output of the ninth multiplexer and a tenth multiplexer receives the output from the ninth memory, tenth memory and the eleventh memory and selectively output one of the received outputs. The fourth submemory means may include the same elements as the third submemory means.

In another embodiment of the present invention, the main operating means includes coefficient multiplying means for receiving the output from the initial operation means, selectively multiplying a coefficient with the received output and outputting the result of the multiplication. Butterfly operation means receive the output of the coefficient multiplying means and the output of the initial operation means and output the result of a butterfly operation of the two signals. Also, signal completion means selectively receive the output from the butterfly operation means, temporarily storing the received output and output the final completed signal. In such a manner the butterfly operation and multiplication may be carried out with a single multiplier.

In a particular embodiment, the coefficient multiplying means includes a fifteenth multiplexer which receives the output of the initial operation means and which selectively outputs the received output of the initial operating means. A read only memory selectively outputs predetermined coefficient values and a multiplier receives the output from the fifteenth multiplexer and the output from the read only memory and outputs the result of a multiplication of the fifteenth multiplexer output and the read only memory output.

In another embodiment of the present invention, the butterfly operation means includes a first latch which receives and stores the output from the initial operation means and outputs the stored output and a second latch which receives and stores the output from the multiplier and outputs the stored output of the multiplier. A second adder receives the output from the first latch and the output of the second latch and outputs the sum of the received outputs and a subtracter receives the output from the first latch and the output from the second latch and outputs the difference between the output of the second latch and the output of the first latch.

In yet another embodiment of the present invention, the signal completing means includes a fifteenth memory which selectively receives and stores the output from the second adder and a sixteenth memory which selectively receives and stores the output from the subtracter.

BREIF DESCRIPTION OF THE DRAWINGS

The above objects and advantages of the present invention will become more apparent by describing in detail preferred embodiments thereof with reference to the attached drawings in which:

FIGS. 1A to 1C are sections of the block diagram of an IDCT system by using Lee's algorithm for the present invention; and FIG. 2 is a flow chart of the signal flow for the IDCT system of FIG. 1.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as an entirely hardware embodiment, an entirely software embodiment or an embodiment combining software and hardware aspects. Furthermore, while the present invention is described herein with respect to particular devices, such as multiplexers, memory and others, as will be appreciated by those of skill in the art, other suitable devices or combinations of devices may be utilized for carrying out the functions of the devices described herein. Furthermore, the present invention may comprise multiple discrete devices or a single integrated circuit.

Figure 1A:
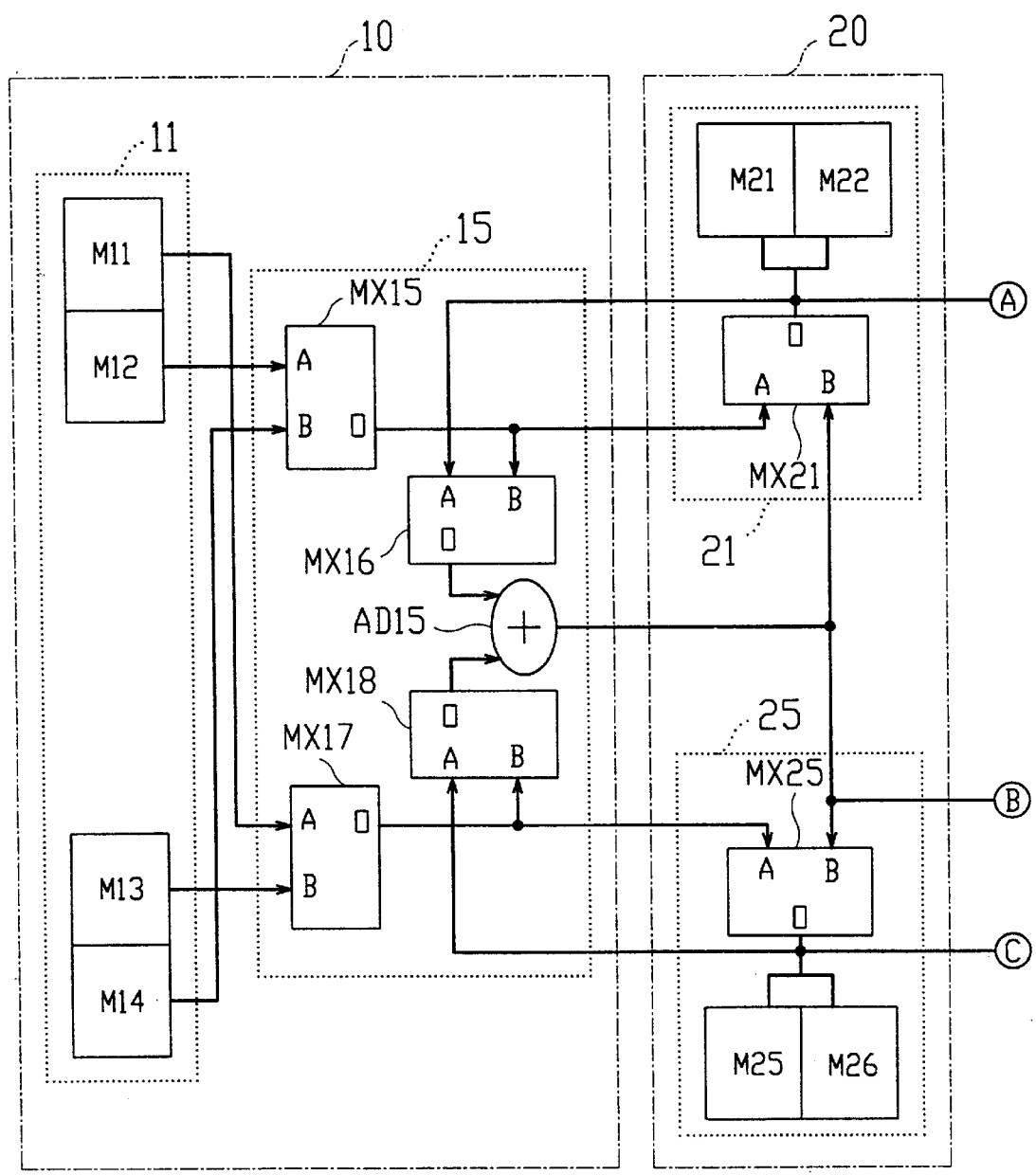
Figure 1B:
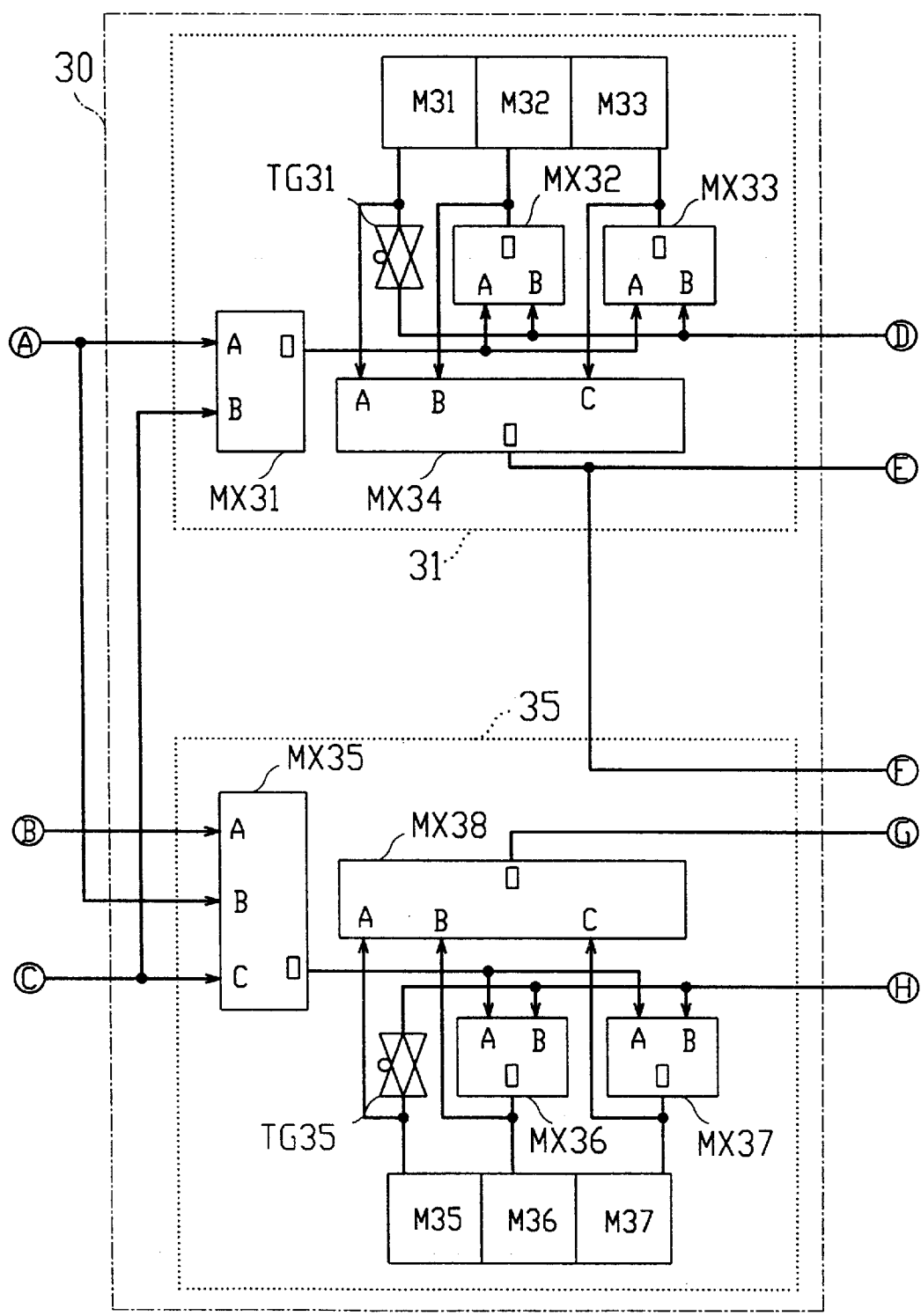
Figure 1C:
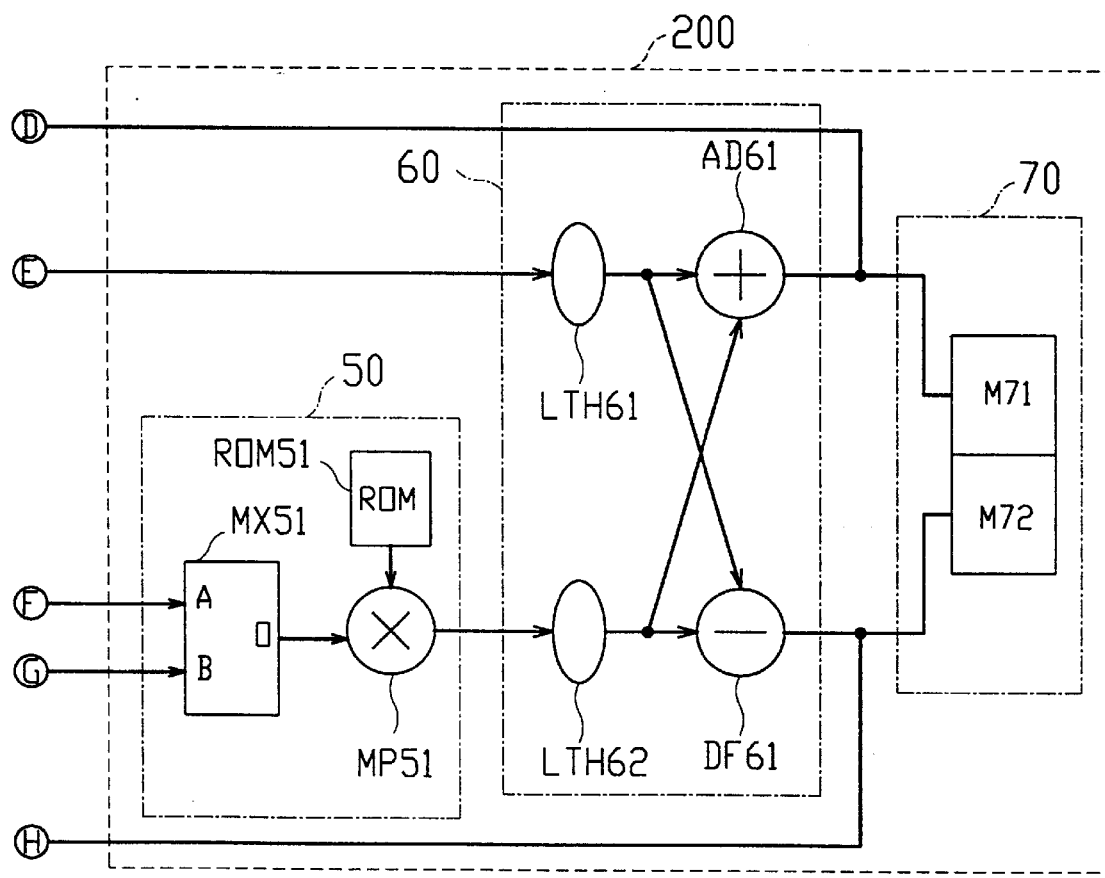

As FIGS. 1A to 1C illustrate, an IDCT system according to the present invention may include an initial operating section 100 which receives cosine transformed data and outputs the result of the add operation of the IDCT and a main operating section 200 which receives the output from the initial operating section 100 and performs the multiplication and butterfly operation of the IDCT utilizing Lee's algorithm.

The initial operating section 100 may include an initial adding section 10 which receives discrete cosine transformed data and first added data and selectively adds the received data and outputs the results as either first added data, second added data or simply passes the original cosine transformed data. A first memory section 20 receives and stores first addition data from the initial adding section 10 and sends back data to the initial adding section 10 to perform a second addition. A second memory section 30 receives, temporarily stores, and outputs the second added data from the initial adding section 10.

As seen in FIG. 1A, the initial adding section 10 may include a data input section 11 which may receive, store and output discrete cosine transformed data and an adding section 15 which receives the discrete cosine transformed data from the data input section 11 and selectively adds and/or outputs required sums or data.

The data input section 11 may include a first memory M11 which receives, temporarily stores and outputs the data points 1 through 4 of the first discrete cosine transformed data and a second memory M12 which receives, temporarily stores and outputs data points 5 through 8 of the first discrete cosine transformed data. A third memory M13 which receives, temporarily stores and outputs points 1 through 4 of a second set of discrete cosine transformed data and a fourth memory M14 which receives, temporarily stores and outputs data points 5 through 8 of the second discrete cosine transformed data may also be included in data input section 11.

The adding section 15 may include a first multiplexer MX15 which receives the output of the second memory M12 and the output of the fourth memory M14 of the data input section 11 and selectively outputs the relevant data as discussed below. A second multiplexer MX16 receives the output from the first multiplexer MX15 and returned data from the first memory section 20 and selectively outputs the relevant data as discussed below. A third multiplexer MX17 receives the output from the first memory M11 and the third memory M13 of the data input section 11 and selectively outputs the relevant data as discussed below. A fourth multiplexer MX18 receives the output from the third multiplexer MX17 and returned data from the first memory section 20 and selectively outputs the relevant data as discussed below. A first adder AD15 receives the output from the second multiplexer MX16 and the fourth multiplexer MX18, adds the two values and outputs the result.

The first memory section 20 may include a first submemory section 21 which receives and stores the relevant data among the first added data from the initial adding section 10 and returns the data to the second multiplexer MX16 for use in the second addition. A second submemory section 25 receives and stores the relevant data among the first added data from the initial adding section 10 and returns the data to the fourth multiplexer MX18 for use in performing the second addition.

The first submemory section 21 may include a fifth multiplexer MX21 which receives the output signal of the first multiplexer MX15 and the output of the first adder AD15. The fifth multiplexer MX21 selectively outputs the relevant data as described below. The first submemory section 21 also may include a fifth memory M21 which receives, temporarily stores and outputs the relevant data among the data selected by the fifth multiplexer MX21. A sixth memory M22 also receives, temporarily stores and outputs the relevant data among the data selected by the fifth multiplexer MX21.

As is also illustrated in FIG. 1A, the second submemory section 25 may include a sixth multiplexer MX25 which receives the output signal of the second multiplexer MX17 and the output of the first adder AD15. The sixth multiplexer MX25 selectively outputs the relevant data as described below. The second submemory section 25 also may include a seventh memory M25 which receives, temporarily stores and outputs the relevant data among the data selected by the sixth multiplexer MX25. An eighth memory M26 also receives, temporarily stores and outputs the relevant data among the data selected by the sixth multiplexer MX25.

As seen in FIG. 1B, the second memory section 30 may include a third submemory section 31 which receives, temporarily stores and outputs the relevant data among the second added data from the initial adding section 10. A fourth submemory section 35 receives, temporarily stores and outputs the relevant data among the second added data from the initial adding section 10.

The above mentioned third submemory section 31 may include a seventh multiplexer MX31 which receives the output of the fifth multiplexer MX21 of the first memory section 20 and the output data of the second multiplexer MX16 of the initial adding section 10 and selectively outputs the relevant data as described below. An eighth multiplexer MX32 receives the output data from the seventh multiplexer MX31 and the returned data from the main operating section 200 and selectively outputs the relevant data as described below. A ninth multiplexer MX33 receives the output from the seventh multiplexer MX31 and the returned data from the main operating section 200 and selectively outputs the relevant data. A first transmission gate TG31 receives and transmits the returned signal from the main operating section 200. A ninth memory M31 receives, temporarily stores and outputs the data from the first transmission gate TG31. A tenth memory M32 receives, temporarily stores and outputs the data from the eighth multiplexer MX32. An eleventh memory M33 receives, temporarily stores and outputs the signal from the ninth multiplexer MX33. Finally, as is seen in FIG. 1B, a tenth multiplexer MX34 receives the output from the ninth memory M31, the tenth memory M32 and the eleventh memory M33 and selectively outputs the relevant data.

Similarly, the fourth submemory section 35 may include an eleventh multiplexer MX35 which receives the output data from the first adder AD15, the fifth multiplexer MX21 and the sixth multiplexer MX25 and selectively outputs the relevant data. A twelfth multiplexer MX36 receives the output data from the eleventh multiplexer MX35 and the returned data from the main operating section 200 and selectively outputs the relevant data as described below. A thirteenth multiplexer MX37 receives the output data from the eleventh multiplexer MX35 and the returned data from the main operating section 200 and also selectively outputs the relevant data. A second transmission gate TG35 receives and transmits the returned data from the main operating section 200. A twelfth memory M35 receives, temporarily stores and outputs the output from the second transmission gate TG35. The thirteenth memory M36 receives, temporarily stores and outputs the output from the twelfth multiplexer MX36 and the fourteenth memory M37 which receives, temporarily stores and outputs the output from the fourteenth multiplexer MX37. A fifteenth multiplexer MX38 receives the memory M35, the twelfth memory M35, the thirteenth memory M36 and the fourteenth memory M37 and selectively outputs the relevant data.

As seen in FIG. 1C, the main operating section 200 may include a coefficient multiplying section 50 which receives and selects the relevant data from the above mentioned initial operating section 100 and outputs the result of the multiplication of the relevant coefficient with the received data. A butterfly operation section 60 receives the output from the coefficient multiplying section 50 and the initial operating section 100 and outputs the result of the butterfly operation of the two outputs. A signal completing section 70 receives and temporarily stores the output from the butterfly operating section 60 and outputs the final completed signal.

The coefficient multiplying section 50 may include a fifteenth multiplexer MX51 which receives the output from the tenth multiplexer MX34 and the fourteenth multiplexer MX38 and selectively outputs the relevant data. A Read Only Memory ROM51 stores predetermined coefficients and outputs the coefficient relevant to the input data. The multiplier MP51 receives the output from the fifteenth multiplexer MX51 and the read only memory ROM51 and outputs the result of the multiplication of those two outputs.

The butterfly operation section 60 may include a first latch LTH61 which receives, temporarily stores and outputs the output from the tenth multiplexer MX34 and a second latch LTH62 which receives, temporarily stores and outputs the output from the multiplier MP51. A second adder AD61 receives the output of the first latch LTH61 and the output of the second latch LTH62 and outputs the sum to the third submemory section 31. A subtracter DF61 receives the output signal from the second latch LTH62, subtracts the output signal from the first latch LTH61 and outputs the difference to the fourth submemory section 35.

The signal completing section 70 may include a fifteenth memory M71 which receives, stores and outputs the output from the adder AD61. A sixteenth memory M72 receives and stores the output from the subtracter DF61.

In operation, the initial operating section 100 receives inverse discrete cosine transformed data and outputs the first added operation of an inverse discrete cosine transformation by using Lee's algorithm. The main operating section 200 receives the output of the initial operating section 100 and outputs the results of the multiplication operation and the butterfly operation of the inverse discrete cosine transformation using Lee's algorithm.

More specifically, the initial adding section 10 of the initial operating section 100 receives the discrete cosine transformed data and the returned data and outputs the addition of the relevant data to the first memory section 20 which receives and stores the first added data from the initial adding section 10. The first added data is returned to the initial adding section 10 for use in a second addition. The second memory section 30 then receives, temporarily stores and outputs the result of the second addition carried out by the initial adding section 10.

Then, the coefficient multiplying section 50 of the main operating section 200 receives the output from the initial operating section 100, chooses the relevant output and outputs the coefficient multiplication of the relevant data. The butterfly operating section 60 receives the output from the coefficient multiplying section 50 and the initial operating section 100 and outputs the two results of the butterfly operation section 60. The signal completing section 70 then receives and stores the signal from the butterfly operating section 60 and outputs the completed final signal.

The operation of the initial operating section 100 will now be described with more detail. The signal input section 11 consists of four storage sections. Each storage section (M11, M12, M13, M14) consists of RAM (Random Access Memory), registers, flip-flops or latches which are capable of receiving, storing and then outputting the discrete cosine transformed data. The discrete cosine transformed data which is input to the signal input section 11 may be two data sets with 8 data points per set. The first data set is input to the first memory M11 and the second memory M12 and the second data set is input to the third memory M13 and the fourth memory M14.

The first memory M11 successively receives, temporarily stores and outputs points 1 to 4 of the first data set of the discrete cosine transformed data. The second memory M12 successively receives, temporarily stores and outputs points 5 to 8 of the first data set of the discrete cosine transformed data. The third memory M13 successively receives, temporarily stores and outputs points 5 to 8 of the second data set of the discrete cosine transformed data. The fourth memory M14 successively receives, temporarily stores and outputs points 1 to 4 of the second data set of the discrete cosine transformed data.

The adding section 15 of the initial adding section 10 receives the data points output by the signal input section 11, selects the relevant data and outputs the result of the addition. More specifically, the first multiplexer MX15 receives the output from the second memory M12 and the fourth memory M14 and selects and outputs the relevant data. The second multiplexer MX16 receives the output from the above mentioned first multiplexer MX15 and the returned signal from the first initial section 20 and selects and outputs the relevant data. The third multiplexer MX17 receives the output from the first memory M11 and the third memory M13 and selects and outputs the relevant data. The fourth multiplexer MX18 receives the output from the third multiplexer MX17 and the returned data from the first memory section 20 and selects and outputs the relevant data. The first adder AD15 receives the output from the second multiplexer MX16 and the output from the fourth multiplexer MX18 and outputs the result of the addition of the two values as first added data.

The first submemory 21 and the second submemory section 25 of the first memory section 20 receive and store the respective outputs among the first added data of the initial adding section 10 and returns the signals to the second multiplexer MX16 of the initial adding section 10 to be used in the second addition. More specifically, the fifth multiplexer MX21 receives the output from the fifth multiplexer MX15 of the initial adding section 10 and the output of the first adder AD15, selects the relevant data and outputs it to the fifth memory M21 or the sixth memory M22. The fifth memory M21 or the sixth memory M22 receive, temporarily store and output the relevant data from the fifth multiplexer MX21.

The operation of each part of the second submemory section 25 is the same as the corresponding memory and multiplexer of the above mentioned first submemory section 21.

The third submemory section 31 and the fourth submemory section 32 of the second memory section 30 receive, temporarily store and output the relevant data among the second added data from the initial adding section 10. The seventh multiplexer MX31 of the third submemory section 31 receives the output from the fifth multiplexer MX21 and the output from the sixth multiplexer MX25 and selects and outputs the relevant data. The eighth multiplexer MX32 and the ninth multiplexer MX33 receive the output from the seventh multiplexer MX31 and the returned data from the main operating section 200. The first transmitting gate TG31 receives and transmits the returned data from the main operating section 200. The ninth memory M31, the tenth memory M32 and the eleventh memory M33 respectively receives the outputs from the first transmitting gate TG31, the eighth multiplexer MX32 and the ninth multiplexer MX33 and temporarily store and output the stored data. The tenth multiplexer MX34 receives the output from the ninth memory M31, the tenth memory M31, the tenth memory M32 and the eleventh memory M33 and selects the relevant output and outputs the data to the main operating section 200.

The operation of the fourth submemory section 35 is the same as the corresponding portion of the above mentioned third submemory section 31.

The coefficient multiplying section 50 of the main operating section 200 receives the output from the initial operating section 100, selects the relevant data and outputs the results of the multiplication of the selected data and the relevant coefficient to the butterfly operation section 60. The butterfly operating section 60 receives the data from the coefficient multiplying section 50 and the initial operating section 100 and outputs the result of the butterfly operation to the completing section 70. The completing section 70 receives the data from the butterfly operation section 60 and temporarily stores and outputs the final completed data.

More specifically, the fifteenth multiplexer MX51 of the coefficient multiplying section 50 receives the output data from the tenth multiplexer MX34 and the output of the fourteenth multiplexer MX38 and selects and outputs the relevant data. Read only memory ROM51 outputs the predetermined coefficient value relevant to the input data and the multiplier MP51 outputs the multiplication of the data from the fifteenth multiplexer MX51 and the read only memory ROM51.

The first latch LTH61 and the second latch LTH62 respectively receive the output from the tenth multiplexer MX34 and the multiplier MP51 and temporarily store and output the stored data.

The second adder AD61 receives the output from the first latch LTH61, adds it to the output from the second latch LTH62 and outputs the result to the third submemory section 31. The subtracter DF61 receives the output from the first latch LTH61 and the output from the second latch LTH62 and outputs the result of the subtraction of the output of the first latch LTH61 from the output of second latch LTH62 to the fourth submemory section 35.

The fifteenth memory M71 and the sixteenth memory M72 of the signal completing section 70 respectively receives the outputs from the second adder AD61 and the subtracter DF61 and store the received outputs and output the stored data. The value which is saved after finishing the final operation is the inverse discrete cosine transformed value.

Table 1 and 2 below show the operation of the each element of the system at a specific operation time point.

Figure 2:
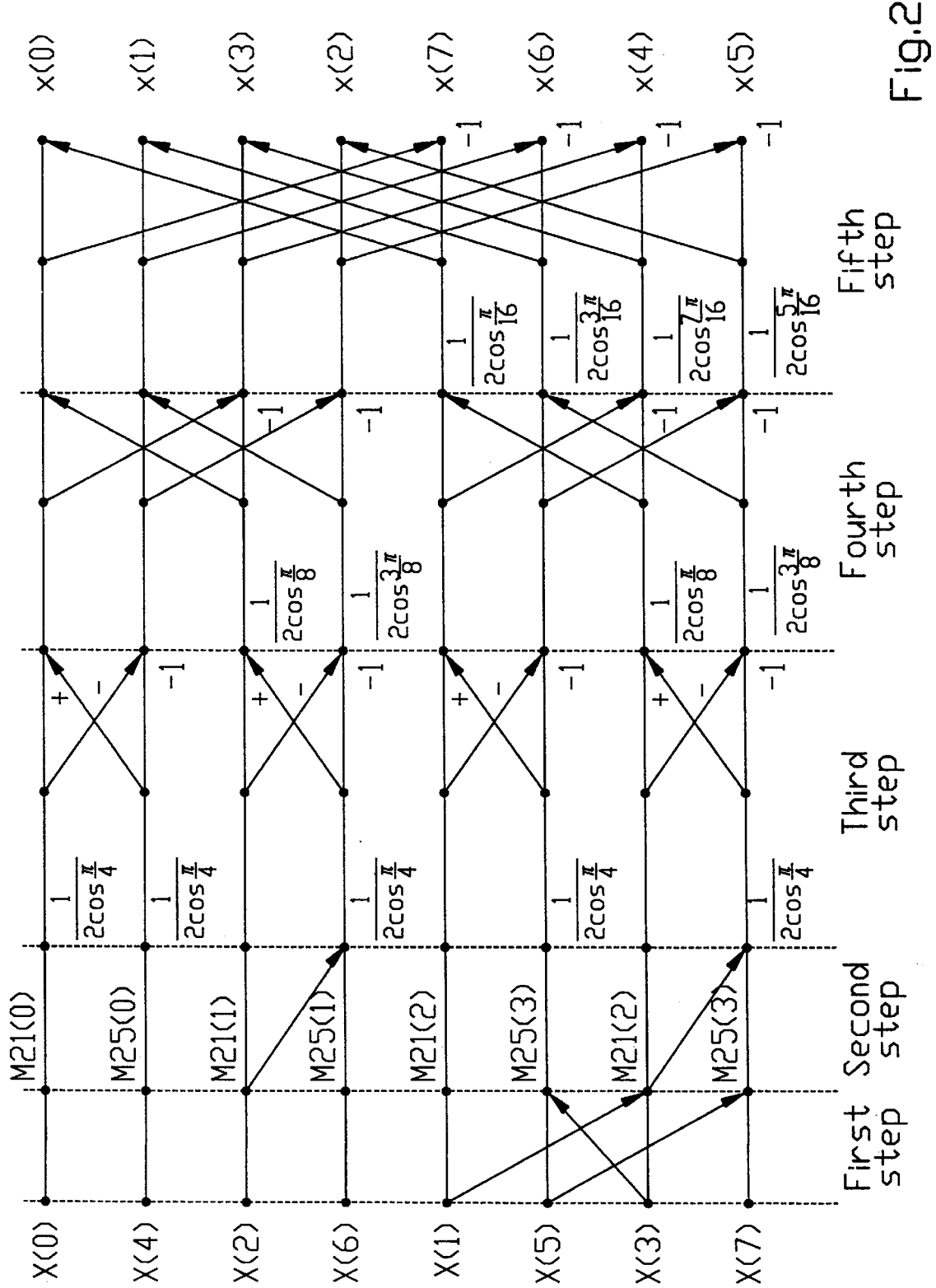

With reference to FIG. 2 and Table 1 and 2, the 8 points of a discrete cosine transformed data(X(0) through X(7)) are stored in the first memory M11 and the second memory M12 or in the fourth memory M14 and the third memory M13 of the data input section 11. The first point (X(0)), the third point (X(2)), the second point (X(1)) and the sixth point (X(5)) of the first discrete cosine transformed data are stored in the second memory M12. The fifth point (X(4)), the seventh point (X(6)), the fourth point (X(3)) and the eighth point (X(7)) are stored in the first memory M11.

As seen in the tables below, the memory elements referred to are reflected in the upper row of the table. References to locations within those memory elements are referred to in corresponding pairs with the type of operation, read or write, being indicated by an "R" or "W" in parentheses adjacent the address values. Thus, for example, a "00(R)" in the column headed by M11 and M12 refers to a read from the "0" location of memory M11 and a read from the "0" location of memory M12.

TABLE 1

| Time | M11 M12 (M14)(M13) | M22 M26 | M21 M25 | M33 M37 | M32 M35 |
|---|---|---|---|---|---|
| T1  | 00(R) | 00(W) | | | |
| T2  | 11(R) | 11(W) | | | |
| T3  | 23(R) | 22(W) | | | |
| T4  | 32(R) | x3(W) | | | |
| T5  | 33(R) | 3x(W) | | | |
| T6  | 44(R) | | 00(W) | | |
| T7  | 55(R) | | 11(W) | | |
| T8  | 67(R) | | 22(W) | | |
| T9  | 76(R) | | x3(W) | | |
| T10 | 77(R) | | 3x(W) | | |
| T11 | | 00(R) | | 00(W) | |
| T12 | | 11(R) | | 11(W) | |
| T13 | | 23(R) | | 22(W) | |
| T14 | | 32(R) | | 33(W) | |
| T15 | | | 00(R) | | 00(W) |
| T16 | | | 11(R) | | 11(W) |
| T17 | | | 23(R) | | 22(W) |
| T18 | | | 32(R) | | 33(W) |

TABLE 2

| TIME | M33 M37 | M32 M36 | M31 M35 | ROM51 | M71 M72 |
|---|---|---|---|---|---|
| T19 | 0x(R) | | | 0 | |
| T20 | x0(R) | | | 0 | |
| T21 | 11(R) | | 01(W) | 0 | |
| T22 | 22(R) | | 10(W) | 0 | |
| T23 | 33(R) | | 23(W) | 0 | |
| T24 | | 0x(R) | 32(W) | 0 | |
| T25 | | x0(R) | | 0 | |
| T26 | | 01(W) | 11(R) | 0 | |
| T27 | | 10(W) | 22(R) | 0 | |
| T28 | | 23(W) | 33(R) | 0 | |
| T29 | | 32(W) | | 00(R) | 1 | |
| T30 | | 02(W) | 11(R) | 2 | |
| T31 | | 13(W) | 22(R) | 1 | |
| T32 | | 20(W) | 33(R) | 1 | |
| T33 | 00(R) | 31(W) | | 1 | |
| T34 | 11(R) | | 02(W) | 2 | |
| T35 | 23(R) | | 13(W) | 1 | |
| T36 | 32(R) | | 20(W) | 2 | |
| T37 | | 00(R) | 31(W) | 3 | 03(W) |
| T38 | | 11(R) | | 4 | 21(W) |
| T39 | | 23(R) | | 5 | 30(W) |
| T40 | | 32(R) | | 6 | 12(W) |
| T41 | | | 00(R) | 3 | 03(W) |
| T42 | | | 11(R) | 4 | 21(W) |
| T43 | | | 23(R) | 5 | 30(W) |
| T44 | | | 32(R) | 6 | 12(W) |

As Table 1 shows, in the first operation time (T1) the first point (X(0)) which is stored in the second memory M12 and the fourth point (X(3)) which is stored in the first memory M11 are read and respectively stored in the first memory location of the sixth memory (M22(0)) and the first memory location of the eighth memory (M26(0)) of the first memory section 20.

In more detail, during the first time period (T1) the first multiplexer MX15 of the adding section 15 selects the first point (X(0)) which is the first location of the second memory M12 of the data input section 11. The third multiplexer MX17 selects and outputs the fifth point (X(4)) which is the first location of the first memory M11 of the data input section 11. The fifth multiplexer MX21 selects the fifth point (X(4)) from the first multiplexer MX15 and stores it in the first location of the sixth memory (M22(0)). The sixth multiplexer MX25 selects the first point (X(0)) from the third multiplexer MX17 and stores it in the first location of the eighth memory (M26(0)).

Likewise, in the second time period (T2) the second point (X(1)) which is stored in the second location of the second memory M12 and the seventh point (X(6)) which is stored in the second location of the first memory M11 are read and respectively stored in the second location of the sixth memory (M22(1)) and the second location of the eighth memory (M26(1)).

In the third operation time (T3), the second point (X(1)) is stored in the third location of the sixth memory (M22(2)) and the second point (X(1)) and the fourth point (X(3)) are added by adding section 15 and stored in the third location of the eighth memory (M26(2)).

In the fourth operation time (T4), the fourth point (X(3)) and the sixth point ((X)5) are added by the adding section 15 and stored in the fourth location of the eighth memory (M26(3)).

In the fifth operation time (T5), the sixth point (X(5)) and the eighth point(X(7)) are added by the adding section 15 and stored in the fourth location of the sixth memory (M22(3))

The operation from the first operation time period (T1) to the fifth operation time (T5) in accordance with FIG. 2, is the first processing step of the first discrete cosine transformed data which is illustrated in Table 3.

TABLE 3

| T1 | T2 | T3 | T4 | T5 |
|---|---|---|---|---|
| M22(0)←X(0) | M22(1)←X(2) | M22(2)←X(1) | | M22(3)←X(5) + X(7) |
| M26(0)←X(4) | M26(1)←X(6) | M26(2)←X(1) + X(3) | M26(3)←X(3) + X(5) | |

Table 3 shows the operation of a system according to the present invention from the first operation time period (T1) through the fifth operation time period (T5). Table 3 reflects the data output by multiplexer MX21 and multiplexer MX25. As FIG. 2 illustrates, in the first step the signals which are input in each memory (M11 through M14) are selectively operated on and stored in each memory (M21, M22, M25, M26). The selective operation on the input signals is performed by the adding section 15 in the relevant operation time as Table 3 above shows.

As shown in Table 1, from the sixth operating time (T6) to the tenth operation time (T10), the second discrete cosine transformed data which was stored in the third memory M13 and the fourth memory M14 of the signal input section 11 is respectively stored in the fifth memory M21 and the seventh memory M25 of the first memory section 20. This operation is performed exactly the same way as that for the first operating time (T1) to the fifth operating time (T5) except the corresponding multiplexer and memories are utilized. This operation is the first processing step for the second discrete cosine transformed data as reflected in FIG. 2.

The operation which is shown in the second step of FIG. 2 is performed from the eleventh operation time period (T11) to the fourteenth operation time period (T14). Table 4 below shows the operation.

The operation from the eleventh operation time period (T11) to the fourteenth operation time period (T14) correspond to the second processing step of the first discrete cosine transformed data seen in FIG. 2.

As shown in Table 1, from the fifteenth operation time period (T15) to the eighteenth operation time (T18), the signals in the fifth memory M21 and the seventh memory M25 are respectively stored in the tenth memory M32 of the third submemory section 31 and the thirteenth memory M36 of the fourth submemory section 35. The operation is performed exactly the same way as that from the eleventh operation time period (T11) to the fourteenth operation time period (T14) but utilizes the corresponding multiplexers and memories and reflects the second processing step for the second discrete cosine transformed data as seen in FIG. 2.

Overall, the third, fourth and the fifth step in FIG. 2 are the calculating step which multiplies the relevant coefficient

TABLE 4

| T11 | T12 | T13 | T14 |
|---|---|---|---|
| M33(0)←M22(0) | M33(1)←M22(1) | M33(2)←M22(2) | M33(3)←M26(2) |
| M37(0)←M26(0) | M37(1)←M26(0) + M33(1) | M37(2)←M26(3) | M37(3)←M26(3) + M33(2) |

More specifically, in the eleventh operation time period (T11) data is read from the first location of the sixth memory (M22(0)) and stored in the first location of the eleventh memory (M33(0)) of the third submemory section 31. Data is also read from the first location of the eighth memory (M26(0)) of the first memory section 20 and stored in the first location of the fourteenth memory (M37(0)) of the fourth submemory section 35.

In the twelfth operation time period (T12), the data is read from the second location of the sixth memory (M22(1)) and is stored in the second location of the eleventh memory (M33(1)). The data from the second location of the sixth memory (M22(1)) and from the second location of the eighth memory (M26(1)) are added and stored in the second location of the fourteenth memory (M37(1)).

In the thirteenth operation time period (T13), the data is read from the third location of the sixth memory (M22(2)) and stored in the third location of the eleventh memory (M33(2)). The data read from the fourth location of the eighth memory (M26(3)) is stored in the third location of the fourteenth memory (M37(2)).

In the fourteenth operation time period (T14), the data read from the third location of the sixth memory (M22(2)) of the first memory section 20 is stored in the fourth location of the eleventh memory (M33(3)) of the third submemory section 31 of the second memory section 30. The data from the fourth location of the sixth memory (M22(3)) and the third location of the eighth memory (M26(2)) are added and the result of the addition is stored in the fourth location of the fourteenth memory (M37(3)).

and performs the butterfly operation These steps are carried out by the main operating section 200.

As Table 2 shows, in the nineteenth operation time period (T19) the 0 address coefficient value of the read only memory ROM51 of the coefficient multiplying section 50 is multiplied with the value stored in the first storage location of the eleventh memory (M33(0)) of the third submemory section 31 of the second memory section 30 and the result is stored in the first latch LTH61 of the butterfly operating section 60. In the twentieth operation time period (T20), the 0 address coefficient value of read only memory ROM51 is multiplied with the value stored in the first storage location of the fourteenth memory (M37(0)) and the result is stored in the second latch LTH62.

The coefficient values which are stored in the address of the read only memory ROM51 are shown in Table 5.

TABLE 5

| ROM(0) | ROM(1) | ROM(2) | ROM(3) | ROM(4) | ROM(5) | ROM(6) |
|---|---|---|---|---|---|---|
| $\dfrac{1}{2\cos\left(\dfrac{\pi}{4}\right)}$ | $\dfrac{1}{2\cos\left(\dfrac{\pi}{8}\right)}$ | $\dfrac{1}{2\cos\left(\dfrac{3\pi}{8}\right)}$ | $\dfrac{1}{2\cos\left(\dfrac{\pi}{16}\right)}$ | $\dfrac{1}{2\cos\left(\dfrac{3\pi}{16}\right)}$ | $\dfrac{1}{2\cos\left(\dfrac{5\pi}{16}\right)}$ | $\dfrac{1}{2\cos\left(\dfrac{7\pi}{16}\right)}$ |

As stated above, the operation of multiplying the coefficient value with a signal is performed in the coefficient multiplying section 50 which receives the signals from the tenth multiplexer MX34 and the fourteenth multiplexer MX38. The multiplier MP51 receives the selected signals from the multiplexers and multiplies the relevant coefficient from the read only memory ROM51.

As seen in Table 2, in the twenty-first operation time period (T21), the two values which are stored in the first latch LTH61 and the second latch LTH62 are the added and the sum is stored in the first location of the ninth memory (M31(0)) and subtracted and the difference stored in the second location of the twelfth memory (M35(1)). The value which is stored in the second location of the eleventh memory (M33(1)) is stored in the first latch LTH61 of the butterfly operating section 60. The result of the multiplication of the 0 address coefficient value of the read only memory ROM51 with the value which is stored in the second location of the fourteenth memory (M37(1)) is stored in the second latch LTH62 of the butterfly operating section 60.

In the twenty-second operation time period (T22), the butterfly operation is carried out with the two values which are stored in the first latch LTH61 and the second latch LTH62 during the twenty-first operation time (T21). The sum of the values stored in the first latch LTH61 and the second latch LTH62 is stored in the second location of the ninth memory (M31(1)). The difference between the values stored in latches LTH61 and LTH62 is stored in the first location of the twelfth memory (M35(0)). The value which is stored in the third location of the eleventh memory (M33(2)) is stored in the first latch LTH61. The 0 address coefficient value of the read only memory ROM51 is multiplied with the value in the third location of the fourteenth memory (M37(2)) and the result stored in the second latch LTH62.

In the twenty-third operation time period (T23), the butterfly operation is performed on the two values which are stored in the first latch LTH61 and the second latch LTH62 during the twenty-second operation time period (T22). The result of the addition is stored in the third location of the ninth memory (M31(2)) and the result of the subtraction is stored in the fourth location of the twelfth memory (M35(3)). The value of the signal which is stored in the fourth location of the eleventh memory (M33(3)) is stored in the first latch LTH61. The 0 address coefficient value of the read only memory ROM51 is multiplied with the value of the signal which is stored in the fourth location of the fourteenth memory (M37(3)) the result stored in the second latch LTH62.

As shown in FIG. 2, the operation from the nineteenth operation time period (T19) to the twenty-third operation time period (T23) corresponds to the third processing step of the first discrete cosine transformed data.

In the twenty-fourth operation time period (T24) the butterfly operation is performed on the two values which are stored in the first latch LTH61 and the second latch LTH62. The result of the addition of the two values is stored in the fourth storage location of the ninth memory (M31(3)) and the result of the subtraction is stored in the third location of the twelfth memory (M35(2)). The value of the signal which is stored in the first location of the tenth memory (M32(0)) is stored in the first latch LTH61.

In the twenty-fifth operation time period (T25) the value which is stored in the first location of the thirteenth memory (M36(0)) is stored in the second latch LTH62 of the butterfly operating section 60.

In the twenty-sixth operation time period (T26) the butterfly operation is performed on the two values which are stored in the first latch LTH61 and the second latch LTH62 in the twenty-fourth operation time period (T24) and in the twenty-fifth operation time period (T25). The result of the addition is stored in the first storage location of the eleventh memory (M33(0)) and the result of the subtraction is stored in the second location of the fourteenth memory (M37(1)). The value which is stored in the second location of the tenth memory (M32(1)) is stored in the first latch LTH61. The 0 address coefficient value of the read only memory ROM51 of the coefficient multiplying section 50 is multiplied with the value which is stored in the second location of the thirteenth memory (M36(1)) and stored in the second latch LTH62.

In the twenty-seventh operation time period (T27) the butterfly operation is performed on the two values which are stored in the first latch LTH61 and the second latch LTH62 in the twenty-sixth operation time period (T26). The result of the addition of the two values is stored in the second location of the eleventh memory (M33(1)) the result of the subtraction is stored in the first location of the fourteenth memory (M37(0)). The value which is stored in the third location of the tenth memory (M32(2)) is stored in the first latch LTH61 and the result of the multiplication of the 0 address coefficient value of the read only memory ROM51 with the value which was stored in the third location of the third thirteenth memory (M36(2)) is stored in the second latch LTH62.

In the twenty-eighth operation time period (T28) the butterfly operation is performed on the two values which are stored in the first latch LTH61 and the second latch LTH62 during the twenty-seventh operation time period (T27). The result of the addition of the two values is stored in the third location of the eleventh memory (M33(2)) and the result of the subtraction is stored in the fourth location of the thirteenth memory (M36(3)). The value of the signal which is stored in the fourth location of the tenth memory (M32(3)) is stored in the first latch LTH61 and the result of the multiplication of the 0 address coefficient value of the read only memory ROM51 with the value of the signal which is stored in the fourth location of the fourteenth memory (M37(3)) is stored in the second latch LTH62.

As shown in FIG. 2, the operation from the twenty-fourth operation time period (T24) to the twenty-eighth operation time period (T28) corresponds to the third processing step time period for the second discrete cosine transformed data.

In the twenty-ninth operation time period (T29) the butterfly operation is performed on the two values which are stored in the first latch LTH61 and the second latch LTH62 during the twenty-eighth operation time period (T28). The result of the addition is stored in the fourth location of the eleventh memory (M33(3)) and the result of the subtraction is stored in the third location of the fourteenth memory (M37(2)). The value of the signal which is stored in the first location of the ninth memory (M31(0)) is stored in the first latch LTH61 of the butterfly operating section 60 and the result of the 1 address coefficient value of the read only memory ROM51 with the value of the signal which is stored in the first location of the twelfth memory (M35(0)) is stored in the second latch LTH62.

In the thirtieth operating time period (T30) the butterfly operation is performed on the two values which are stored in the first latch LTH61 and the second latch LTH62 during the twenty-ninth operation time period (T29). The result of the addition of the two values is stored in the first location of the tenth memory (M32(0)) and the result of the subtraction is stored in the third location of the third thirteenth memory (M36(2)). The value which is stored in the second location of the ninth memory (M31(1)) is stored in the first latch LTH61. The value which results from the multiplication of the 2 address coefficient value of the read only memory ROM51 with the value of the signal which is stored in the second location of the twelfth memory (M35(1)) is stored in the second latch LTH62.

In the thirty-first operation time period (T31) the butterfly operation is performed on the two values which are stored in the first latch LTH61 and in the second latch LTH62 during the thirtieth operation time period (T30). The result of the addition of the two values is stored in the second location of the tenth memory (M32(1)) and the result of the subtraction is stored in the fourth location of the thirteenth memory (M36(3)). The value stored in the third location of the ninth memory (M31(2)) is stored in the first latch LTH61 and the result of the multiplication of the 1 address coefficient value of the read only memory ROM51 with the value of the signal stored in the third location of the twelfth memory (M35(2)) is stored in the second latch LTH62.

In the thirty-second operation time period (T32) the butterfly operation is performed on the two values which are stored in the first latch LTH61 and the second latch LTH62 in the thirty-first operating time period (T31). The result of the addition of the two values is stored in the third location of the tenth memory (M32(2)) and the result of the subtraction is stored in the first location of the thirteenth memory (M36(0)). The value which is stored in the fourth location of the ninth memory (M31(3)) is stored in the first latch LTH61 and the result of the multiplication of the 2 address coefficient value of the read only memory ROM51 with the value stored in the fourth location of the twelfth memory (M35(3)) is stored in the second latch LTH62.

The operation from the twenty-ninth operation time period (T29) to the thirty-second operation time period (T32) corresponds to the fourth processing step of the first discrete cosine transformed data as shown in FIG. 2.

In the thirty-third operation time period (T33) the butterfly operation is performed on the two values which are stored in the first latch LTH61 and the second latch LTH62 in the thirty-second operation time period (T32). The result of the addition of the two values is stored in the fourth location of the tenth memory (M32(3)) and the result of the subtraction is stored in the second location of the thirteenth memory (M36(1)). The value stored in the first location of the eleventh memory (M33(0)) is stored in the first latch LTH61 and the result of the multiplication of the 1 address coefficient value of the read only memory ROM51 with the value stored in the first location of the fourteenth memory (M37(0)) is stored in the second latch LTH62.

In the thirty-fourth operation time period (T34) the butterfly operation is performed the two values which are stored in the first latch LTH61 and the second latch LTH62 in the thirty-third operation time period (T33). The result of the addition of the two values is stored in the first location of the ninth memory (M31(0)) the result of the subtraction is stored in the third location of the twelfth memory (M35(2)). The value stored in the second location of the eleventh memory (M33(1)) is stored in the first latch LTH61 and the result of the multiplication of the 2 address coefficient value of the read only memory ROM51 with the value stored in the second location of the fourteenth memory (M37(1)) is stored in the second latch LTH62.

In the thirty-fifth operation time period (T35) the butterfly operation is performed on the two values which are stored in the first latch LTH61 and second latch LTH62 in the thirty-fourth operating time period (T34). The result of the addition of the two values is stored in the second location of the ninth memory (M31(1)) and the result of the subtraction is stored in the fourth location of the twelfth memory (M35(3)). The value stored in the third location of the eleventh memory (M33(2)) is stored in the first latch LTH61 and the result of multiplication of the 1 address coefficient value of the read only memory ROM51 with the value stored in the fourth location of the fourteenth memory (M37(3)) is stored in the second latch LTH62 of the butterfly operating section 60.

In the thirty-sixth operation time period (T36) the butterfly operation is performed on the two values which are stored in the first latch LTH61 and in the second latch LTH62 in the thirty-fifth operation time period (T35). The result of the addition of the two values is stored in the third location of the ninth memory (M31(2)) and the result of the subtraction is stored in the first location of the twelfth memory (M35(0)). The value stored in the fourth location of the eleventh memory (M33(3)) is stored in the first latch LTH61 and the result of the multiplication of the 2 address coefficient value of the read only memory ROM51 with the value stored in the third location of the fourteenth memory (M37(2)) is stored in the second latch LTH62.

The operation from the thirty-third operation time period (T33) to the thirty-sixth operation time period (T36) is the fourth processing step of the second discrete cosine transformed data, as shown in FIG. 2.

In the thirty-seventh operation time period (T37) the butterfly operation is performed on the two values which are stored in the first latch LTH61 and the second latch LTH62 in the thirty-sixth operation time (T36). The result of the addition of the two values is stored in the fourth location of the ninth memory (M31(3) and the result of the subtraction is stored in the second location of the twelfth memory (M35(1)). The value stored in the first location of the tenth memory (M32(0)) is stored in the first latch LTH61 and the result of the multiplication of the 3 address coefficient value of the read only memory ROM51 with the value stored in the first location of the thirteenth memory (M36(0)) is stored in the second latch LTH62. Then, the butterfly operation is performed on the two signals which are stored in the first latch LTH61 and the second latch LTH62 and the result of the addition of the two values stored in the first location of the fifteenth memory (M71(0)). The result of the subtraction is stored in the fourth location of the sixteenth memory (M72(3)).

In the thirty-eighth operation time period (T38) the value which is stored in the second location of the tenth memory (M32(1)) is stored in the first latch LTH61 and the result of the multiplication of the 4 address coefficient value of the read only memory ROM51 with the value of the signal which is stored in the second location of the thirteenth memory (M36(1)) is stored in the second latch LTH62. Then, the butterfly operation is performed on the two values which are stored in the first latch LTH61 and the second latch LTH62. The result of the addition of the two values is stored in the third location of the fifteenth memory (M71(2)) and the result of the subtraction is stored in the second location of the sixteenth memory (M72(1)).

In the thirty-ninth operation time period (T39) the value stored in the third location of the tenth memory (M32(2)) is stored in the first latch LTH61 and the result of the multiplication of the 5 address coefficient value of the read only memory ROM51 with the value stored in the fourth location of the thirteenth memory (M36(3)) is stored in the second latch LTH62. Then, the butterfly operation is performed on the two values which are stored in the first latch LTH61 and the second latch LTH62. The result of the addition of the two values is stored in the fourth location of the fifteenth memory (M71(3)) and the result of the subtraction is stored in the first location of the sixteenth memory (M72(0)).

In the fortieth operation time period (T40) the value stored in the fourth location of the tenth memory (M32(3)) is stored in the first latch LTH61 and the result of the multiplication of the 6 address coefficient value of the read only memory ROM51 with the value stored in the third location of the thirteenth memory (M36(2)) is stored in the second latch LTH62. Then, the butterfly operation is performed on the two values stored in the first latch LTH61 and the second latch LTH62. The result of the addition of the two values is stored in the second location of the fifteenth memory (M71(1)) and the result of the subtraction is stored in the third location of the sixteenth memory (M72(2)).

The operation from the thirty-seventh operation time period (T37) to the fortieth operation time period (T40) is the fifth processing step of the first discrete cosine transformed data as shown in FIG. 2. The signals which are stored in the storage location of the fifteenth memory M71 and the sixteenth memory M72 is the inverse discrete cosine transformed final value of the first data.

In the forty-first operation time period (T41) the value stored in the first location of the ninth memory (M31(0)) is stored in the first latch LTH61 and the result of the multiplication of the 3 address coefficient value of the read only memory ROM51 with the value stored in the first location of the twelfth memory (M35(0)) is stored in the second latch LTH62. Then, the butterfly operation is performed on the two values which are stored in the first latch LTH61 and the second latch LTH62. The result of the addition of the two values is stored in the first location of the fifteenth memory (M71(0)) and the result of the subtraction is stored in the fourth location of the sixteenth memory (M72(3)).

In the fourty-second operation time period (T42) the value stored in the second location of the ninth memory (M31(1)) is stored in the first latch LTH61 and the result of the multiplication of the 4 address coefficient value of the read only memory ROM51 with the value stored in the second location of the twelfth memory (M35(1)) is stored in the second latch LTH62. Then, the butterfly operation is performed on the two values which are stored in the first latch LTH61 and the second latch LTH62. The result of the addition of the two values is stored in the third location of the fifteenth memory (M71(2)) and the result of the subtraction is stored in the second location of the sixteenth memory (M72(1)).

In the fourty-third operation time period (T43) the value stored in the third location of the ninth memory (M31(2)) is stored in the first latch LTH61 and the result of the multiplication of the 5 address coefficient value of the read only memory ROM51 with the value stored in the fourth location of the twelfth memory (M35(2)) is stored in the second latch LTH62. Then, the butterfly operation is performed with the two values which are stored in the first latch LTH61 and the second latch LTH62. The result of the addition of the two values is stored in the fourth location of the fifteenth memory (M71(3)) and the result of the subtraction is stored in the first location of the sixteenth memory (M72(0)).

In the fourty-fourth operation time period (T44) the value stored in the fourth location of the ninth memory (M31(3)) is stored in the first latch LTH61 and the result of the multiplication of the 6 address coefficient value of the read only memory ROM51 with the value stored in the third location of the twelfth memory (M35(2)) is stored in the second latch LTH62. Then, the butterfly operation is performed on the two values which are stored in the first latch LTH61 and the second latch LTH62. The result of the addition of the two values is stored in the second location of the fifteenth memory (M71(1)) the result of the subtraction is stored in the third location of the sixteenth memory (M72(2)).

The operation from the fourty-first operation time period (T41) to the fourty-fourth operation time period (T44) corresponds to the fifth processing step of the second discrete cosine transformed data, as seen in FIG. 2 for the first data. The signals which are stored in each storage location of the fifteenth memory M71 and the sixteenth memory M72 is the inverse discrete cosine transformed final value of the second data.

In the drawings and specification, there have been disclosed typical preferred embodiments of the invention and, although specific terms are employed, these terms are used in a generic and descriptive sense only and not for purposes of limitation, the scope of the invention being set forth in the following claims.

That which is claimed is:

1. An inverse discrete cosine transformation system using Lee's algorithm, comprising:

initial operating means for receiving a discrete cosine transformation data and outputting the result of a first and second addition of the inverse discrete cosine transformation data using Lee's algorithm; and main operation means for receiving the result of the first and second addition of the inverse discrete cosine transformation using Lee's algorithm from said initial operation means and outputting the result of the multiplication operation and butterfly operation of the inverse discrete cosine transformation by using Lee's algorithm; and wherein said initial operating means comprises:

initial adding means for receiving the discrete cosine transformation data and selectively performing an addition to provide first added data and for selectively performing a second addition of the discrete cosine transformation data and said first added data to provide second added data;

first memory means for receiving and storing the first added data from said initial adding means and discrete cosine transformed data and for selectively returning first added data and discrete cosine transformed data to said initial adding means for use in the second addition to provide the second added data; and second memory means for receiving, temporarily storing and outputting discrete cosine transformed data and the second added data received from said initial adding means.

2. The inverse discrete cosine transformation system according to claim 1, wherein said initial adding means comprises:

data input means for receiving the discrete cosine transformed data, temporarily storing and outputting the discrete cosine transformed data; and adding means for receiving the data from said data input means and selectively performing an addition of the discrete cosine transformed data and outputting the result as first added data.

3. The inverse discrete cosine transformation system according to claim 2, wherein said data input means comprises:

a first memory which receives data points 1 through 4 of a first set of discrete cosine transformed data, temporarily stores the data points and selectively outputs the stored data;

a second memory which receives data points 5 through 8 of the first set of discrete cosine transformed data, temporarily stores the data points and selectively outputs the stored data;

a third memory which receives data points 5 through 8 of a second set of discrete cosine transformed data, temporarily stores the data points and selectively outputs the stored data; and a fourth memory which receives data points 1 through 4 of the second set of discrete cosine transformed data, temporarily stores the data points and selectively outputs the stored data.

4. The inverse discrete cosine transformation system according to claim 3, wherein said adding means comprises:

a first multiplexer which receives the stored data from said second memory and said fourth memory of said data input means and which selectively outputs the received data;

a second multiplexer which receives the output from said first multiplexer and the returned data from said first memory means and which selectively outputs the output from the first multiplexer and the returned data;

a third multiplexer which receives data from said first memory and said third memory of said data input means and which selectively outputs the received data;

a fourth multiplexer which receives the output from said third multiplexer and the returned data from said first memory means and which selectively outputs the received data; and a first adder which receives the output from said second multiplexer and the output from said fourth multiplexer and adds the values of the data received from said second multiplexer and said fourth multiplexer and outputs a result of the addition.

5. The inverse discrete cosine transformation system according to claim 4, wherein said first memory means comprises:

a first submemory means for selectively storing the first added data from said initial adding means and discrete cosine transformed data and for outputting the stored data to said second multiplexer of said initial adding means for use in a second addition; and a second submemory means for selectively storing the first added data from said initial adding means and discrete cosine transformed data and for outputting the stored data to said fourth multiplexer of said initial adding means for use in a second addition.

6. The inverse discrete cosine transformation according to claim 5, wherein said first submemory means comprises:

a fifth multiplexer which receives the output from said first multiplexer of said initial adding means and the output from said first adder and which selectively outputs one of said output from said first multiplexer and said output from said first adder;

a fifth memory which selectively receives, temporarily stores and outputs the stored output of said fifth multiplexer; and a sixth memory which selectively receives, temporarily stores and outputs the stored output of said fifth multiplexer.

7. The inverse discrete cosine transformation according to claim 5, wherein said second submemory means comprises:

a sixth multiplexer which receives the output from said third multiplexer of said initial adding means and the output from said first adder and which selectively outputs one of said output from said third multiplexer and said output from said first adder;

a seventh memory which selectively receives, temporarily stores and outputs the stored output of said sixth multiplexer; and an eighth memory which selectively receives, temporarily stores and outputs the stored output of said sixth multiplexer.

8. The inverse discrete cosine transformation according to claim 1, wherein said second memory means comprises:

third submemory means for selectively receiving, storing and outputing said second added data; and fourth submemory means for selectively receiving, storing and outputing said second added data.

9. The inverse discrete cosine transformation according to claim 8, wherein said third submemory means comprises:

a seventh multiplexer which receives the output of said fifth multiplexer and the output of said sixth multiplexer and selectively outputs one of said output of said fifth multiplexer and said output of said sixth multiplexer;

an eighth multiplexer which receives the output of said seventh multiplexer and the returned data from said main operating means and selectively outputs one of said output of said seventh multiplexer and said returned data;

a ninth multiplexer which receives the output of said seventh multiplexer and the returned data from said main operating means and selectively outputs one of said output of said seventh multiplexer and said returned data;

a first transmitting gate which receives the returned data from said main operating means and outputs the data;

a ninth memory which receives the data from said first transmitting gate, temporarily stores the data and outputs the stored data;

a tenth memory which receives the output of said eighth multiplexer, temporarily stores the output of said eighth multiplexer and outputs the stored output of the eighth multiplexer;

an eleventh memory which receives the output from said ninth multiplexer, temporarily stores the output of the ninth multiplexer and outputs the stored output of the ninth multiplexer; and a tenth multiplexer which receives the output from said ninth memory, tenth memory and said eleventh memory and selectively output one of said received outputs.

10. The inverse discrete cosine transformation according to claim 8, wherein said fourth submemory means comprises:

an eleventh multiplexer which receives the output from said first adder of said initial adding means, the output from said fifth multiplexer and the output from said sixth multiplexer of said first memory means and selectively outputs one of said received outputs;

a twelfth multiplexer which receives the output from said eleventh multiplexer and the returned data from said main operating means and selectively outputs one of said output of said eleventh multiplexer and said returned data;

a thirteenth multiplexer which receives the output from said eleventh multiplexer and the returned data from said main operating means and selectively outputs one of said output of said eleventh multiplexer and said returned data;

a second transmitting gate which receives the returned data from said main operating means and outputs the data;

a twelfth memory which receives the output from said second transmitting gate, temporarily stores the output from the second transmitting gate and selectively outputs the stored output;

a thirteenth memory which receives the output from said twelfth multiplexer, temporarily stores the output and selectively outputs the stored output;

a fourteenth memory which receives the output from said twelfth multiplexer, temporarily stores the output and selectively outputs the stored output; and a fourteenth multiplexer which receives the output from said twelfth memory, the output from said thirteenth memory and the output from said fourteenth memory and selectively outputs one of said received outputs.

11. An inverse discrete cosine transformation system using Lee's algorithm, comprising:

initial operating means for receiving a discrete cosine transformation data and outputtings the result of a first and second addition of the inverse discrete cosine transformation data using Lee's algorithm; and main operation means for receiving the result of the first and second addition of the inverse discrete cosine transformation using Lee's algorithm from said initial operation means and outputting the result of the multiplication operation and butterfly operation of the inverse discrete cosine transformation by using Lee's algorithm; and wherein said main operating means comprises:

coefficient multiplying means for receiving the output from said initial operation means, selectively multiplying a coefficient with the received output and outputting the result of the multiplication;

butterfly operation means for receiving the output of said coefficient multiplying means and the output of said initial operation means and outputting the result of a butterfly operation of the two signals; and signal completion means for selectively receiving the output from said butterfly operation means, temporarily storing the received output and outputting the final completed signal.

12. The inverse discrete cosine transformation according to claim 11, wherein said coefficient multiplying means comprises:

a fifteenth multiplexer which receives the output of said initial operation means and which selectively outputs the received output of said initial operating means;

a read only memory for selectively outputting predetermined coefficient values; and a multiplier which receives the output from said fifteenth multiplexer and the output from said read only memory and outputs the result of a multiplication of said fifteenth multiplexer output and said read only memory output.

13. The inverse discrete cosine transformation according to claim 12 wherein said butterfly operation means comprises:

a first latch which receives and stores the output from said initial operation means and outputs the stored output;

a second latch which receives and stores the output from said multiplier and outputs the stored output of the multiplier;

a second adder which receives the output from said first latch and the output of said second latch and outputs the sum of the received outputs; and a subtracter which receives the output from said first latch and the output from said second latch and outputs the difference between the output of said second latch and the output of said first latch.

14. The inverse discrete cosine transformation according to claim 13, wherein said signal completing means comprises:

a fifteenth memory which selectively receives and stores the output from said second adder; and a sixteenth memory which selectively receives and stores the output from said subtracter.

* * * * *

UNITED STATES PATENT AND TRADEMARK OFFICE
CERTIFICATE OF CORRECTION

PATENT NO. : 5,841,682
DATED : Novembeg 24, 1998
INVENTOR(S) : Choi et al.

It is certified that error appears in the above-identified patent and that said Letters Patent is hereby corrected as shown below:

Claim 11, line 4, delete "outputtings" and replace with --outputting--.

Signed and Sealed this

Twenty-seventh Day of July, 1999

Attest:

Q. TODD DICKINSON

*Attesting Officer*   *Acting Commissioner of Patents and Trademarks*